US005672699A

United States Patent [19]
Billmers et al.

[11] Patent Number: 5,672,699
[45] Date of Patent: Sep. 30, 1997

[54] PROCESS FOR PREPARATION OF HYDROPHOBIC STARCH DERIVATIVES

[75] Inventors: Robert L. Billmers, Stockton; Victor L. Mackewicz, Califon, both of N.J.

[73] Assignee: National Starch and Chemical Investment Holding Corporation, Wilmington, Del.

[21] Appl. No.: 524,281

[22] Filed: Sep. 6, 1995

[51] Int. Cl.$^6$ .......................... C08B 31/00; C08B 33/00; C08B 35/00; C08B 35/04
[52] U.S. Cl. .......................................... 536/102; 536/111
[58] Field of Search ..................... 536/102, 107, 536/108, 110, 111

[56] References Cited

U.S. PATENT DOCUMENTS

| | | | |
|---|---|---|---|
| 2,461,139 | 2/1949 | Caldwell | 536/110 |
| 2,661,349 | 12/1953 | Caldwell et al. | 536/110 |
| 4,770,710 | 9/1988 | Friedman et al. | 127/29 |
| 5,321,132 | 6/1994 | Billmers et al. | 536/48 |

OTHER PUBLICATIONS

"Starch: Chemistry and Technology", Second Edition, edited by R. Whisler et al., 1988, pp. 341–343.

"Modified Starches—Properties and Uses", Edited by O. Wurzburg, 1986, Chap. 9, pp. 131–147.

*Primary Examiner*—Nathan M. Nutter
*Attorney, Agent, or Firm*—Eugene Zagarella, Jr.

[57] ABSTRACT

A method for preparing hydrophobic starch derivatives wherein the starch and anhydride reagent are predispersed or intimately contacted by mixing at low acidic pH to form a stable dispersion before being brought to alkaline reaction conditions.

15 Claims, No Drawings

PROCESS FOR PREPARATION OF HYDROPHOBIC STARCH DERIVATIVES

BACKGROUND OF THE INVENTION

This invention relates to a process for preparing starch derivatives of substituted dicarboxylic acid anhydrides and particularly the more hydrophobic starch derivatives.

The preparation of starch derivatives and especially hydrophobic derivatives such as starch alkyl or alkenyl succinates is well known and has been carried out for many years. U.S. Pat. No. 2,661,349 issued on Dec. 1, 1953 to C. Caldwell and O. Wurzburg describes such starch derivatives and the aqueous method in which they are prepared using a standard esterification reaction where the reagent and starch suspended in water are mixed under alkaline conditions. Other methods for preparing the starch derivatives are disclosed in the '349 patent, including an organic suspension or dispersion method and a so called dry method using starch in the commercially dry form, i.e., starch having a moisture content of approximately 5 to 20%. The starch derivatives and method of preparation are further described in "Starch: Chemistry and Technology", Second Edition, edited by R. L. Whistler et al., 1988, pp. 341-343 and "Modified Starches: Properties and Uses", edited by O. Wurzburg, 1986, Chapter 9, pp. 131-147.

The reaction of hydrophobic reagents such as octenyl succinic anhydride (OSA) in aqueous systems are limited by their solubility, moderate reaction efficiencies and long reaction times. Typical reactions with OSA are accomplished with less than 10 percent treatment, usually with 3 to 5 percent. At higher levels of reagent the reaction efficiency drops off sharply due to the hydrophobic nature of the reagent. Reagents with longer side chains, i.e., dodecenyl, hexadecenyl, etc., have even lower solubility in water and are much harder to react under the known conditions and in fact in some cases would not react at all.

Accordingly, what is desired in a new method for preparing starch derivatives at improved and significantly higher reaction efficiencies that is especially useful with long side chain reagents and thus able to provide more hydrophobic derivatives.

SUMMARY OF THE INVENTION

Now in accordance with this invention an improved method for preparing hydrophobic starch derivatives is provided wherein the starch and anhydride reagent are predispersed or intimately contacted by mixing at low acidic pH before being brought to reaction conditions.

More particularly, this invention involves a method of preparing a hydrophobic starch derivative comprising reacting starch with an organic acid anhydride in an aqueous system wherein:

a) starch is slurried in water at an acidic pH of less than 7.0, b) adding to the slurry an organic acid anhydride reagent having the formula:

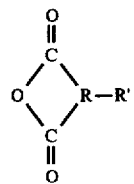

where R is a dimethylene or trimethylene group and R' is a hydrocarbon group having 2 to 20 carbon atoms, c) intimately contacting the starch and anhydride reagent by mixing to form a stable dispersion, d) adding alkali material to the starch dispersion to adjust the pH to an alkaline pH of greater than 7.0 to initiate the reaction and continue adding alkali material to maintain that pH until the reaction is complete.

DETAILED DESCRIPTION OF THE INVENTION

The hydrophobic starch derivatives prepared by the method of this invention are prepared by reacting starch and an organic acid anhydride reagent and have the following formula:

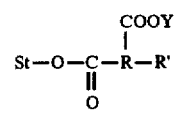

where St is the starch base material, R is a dimethylene or trimethylene group, R' is a hydrocarbon group having 2 to 20 carbons, and Y is H, alkali metal, alkaline earth metal or ammonium.

The base starch material used herein may be any of several granular starches, native, converted or derivatized. Such starches include those derived from any plant source including corn, potato, wheat, rice, sago, tapioca, waxy maize, sorghum and high amylose starch such as high amylose corn, i.e., starch having at least 40% and more particularly at least 65% amylose content by weight, etc., starch flours may also be used. Also included are the conversion products derived from any of the former bases such as, for example, dextrins prepared by hydrolytic action of acid and/or heat; fluidity or thin boiling starches prepared by enzyme conversions or mild acid hydrolysis; oxidized starches prepared by treatment with oxidants such as sodium hypochlorite; and derivatized starches such as cationic, anionic, amphoteric, non-ionic and crosslinked.

The organic acid anhydride reagent material used in the method of this invention will have the following structural formula:

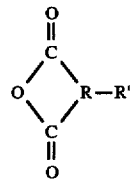

where R represents a dimethylene or trimethylene group and R' is a substituent hydrocarbon group having 2 to 20 carbons, more particularly 5 to 18, and preferably 8 to 12 carbons.

The hydrocarbon or hydrophobic substituent group R' may be alkyl, alkenyl, aralkyl or aralkenyl with alkyl and alkenyl being preferred. R' may be joined to the anhydride moiety R through a carbon-to-carbon bond (as in alkenyl succinic anhydride) or through two carbon-to-carbon bonds (as in the adduct of maleic anhydride with methyl pentadiene, or as in the cyclo-paraffinic cyclo-dicarboxylic acid anhydrides such as cyclo hexane 1,2-dicarboxylic acid anhydride), or may be linked through an ether or ester linkage (as in octyloxy succinic anhydride or in capryloxy succinic anhydride).

The important step in the method of this invention involves forming a stable dispersion of the starch and anhydride mixture at a low acidic pH. This stable dispersion is formed by intimately contacting the starch and anhydride by agitation, mixing, blending or emulsifying the components. Intimately contacting is defined as sufficient agitation to prevent the reagent from separating from the starch slurry without additional agitation or after the agitation has been stopped. Enough agitation is needed to form a stable dispersion, i.e., reagent won't separate from starch. A small to moderate amount of agitation or mixing will provide suitable conditions wherein the anhydride reagent is adsorbed into the starch granule and a stable dispersion is formed. This amount of agitation needed will vary with different anhydrides. Agitation can be performed in various ways using, e.g., high speed mixing, injection through a venturi or emulsification.

The pH during the predispersion of the starch and anhydride as noted above, must be acidic or below 7.0. More particularly, the pH will be from about 1 to 6 and preferably about 2 to 3 during the intimate contacting of the starch and anhydride reagent and the formation of a stable dispersion. Under these acidic conditions the dispersion will not begin to react.

Reaction of the starch and anhydride reagent is initiated by adjusting the pH to the alkaline side or greater than 7.0 with the addition of an alkali material. After the system reaches the desired pH and the reaction is begun, the reaction is continued by adding enough alkali to maintain this pH level. Suitable pH range for carrying out the reaction is from about 7.1 to 11 and preferably from about 8 to 9.

Any alkali material may be used as the alkali reagent or alkali medium in the method of this invention. Particularly useful alkali materials are the alkali metal hydroxides and alkaline earth metal hydroxides or the Group IA or IIA hydroxides, oxides, carbonates or other salts. Illustrative alkali materials are sodium hydroxide, potassium hydroxide, calcium hydroxide, ammonium hydroxide, magnesium hydroxide, sodium carbonate and trisodium phosphate. Preferred alkalis are the alkali metal hydroxides and most preferred is sodium hydroxide.

The reaction can be carried out at room temperature (typically 22.5° C.) although a range of temperatures can be used depending on the reagents used. More particularly, a temperature range of about 10° to 50° C. and preferably about 25° to 40° C. may be used.

The amount of organic acid anhydride that is to be used in the reaction will depend on the particular anhydride reagent and starch used and will depend on the properties desired in the final product as will the nature of the reaction. Amounts of the anhydride can vary from about 1 to 100% by weight based on the weight of starch, more particularly from about 2 to 60% and preferably from about 3 to 10%.

The starch is initially slurried in water at between 5 and 45% solids, more preferably 25 to 35%. The pH is adjusted to less than 7.0 by addition of any inorganic or mineral acid, typically hydrochloric or sulfuric acid.

After the reaction, the product is recovered by standard techniques such as filtration and centrifugation.

In carrying out the method of this invention as described herein, several advantages result. First of all, starch derivatives having greater hydrophobicity than those prepared using known procedures can now be readily obtained. Reaction conditions are significantly better with much higher reaction efficiencies, reduced operating times and greater overall control of process conditions. The ability to provide increased hydrophobicity has broadened the application of this group of starch derivatives to areas such as paper coating, which need this characteristic.

The following examples will further illustrate the embodiments of this invention. In these examples all parts are given by weight and all temperatures in degrees Celsius unless otherwise noted.

EXAMPLE I

In a Waring blender cup, 500 g of distilled water was mixed with 250 g of starch (waxy maize) having a water fluidity (WF) of 69. The starch and water was mixed under low speed conditions for approximately one minute and then the pH was adjusted using dilute HCl to pH of 2.0. Twenty-five (25) g of dodecenyl succinic anhydride (DDSA) was added to the starch slurry. The slurry was then mixed at high speed for one minute. The suspension was poured into a 2 L stainless steel beaker which was fitted with a pH controller attached to a metering pump to maintain the pH of the reaction. The metering pump was supplied with 3% NaOH to maintain the pH of 8.0 for the duration of the reaction. The reaction was considered to be complete when the pH was constant without the addition of NaOH solution for more than 30 minutes. The reaction pH was adjusted to 5.5 to 6.0 with dilute acid (HCl) and the product filtered. Purification was obtained by resuspending in 500 mL of distilled water, filtering and washing with 250 mL of distilled water. Resuspension in 500 mL of 99% isopropanol, followed by filtration and washing with water gave the purified product. The percent bound reagent was 5.14 and the reaction time is shown below in Table 1 as 12 hours.

EXAMPLE II

Several additional starch derivatives were prepared in the same manner as that in Example I using the anhydride reagents, treatment level (percent anhydride reagent based on weight of starch) as shown below in Table 1. Table 1 also shows the percent of bound anhydride reagent on the prepared starch derivative as well as the reaction completion time in hours.

Control samples were also prepared using the known aqueous alkaline systems in the following manner. A total of 100 g of starch was added to a 500 mL beaker along with 150 mL water and mixing. The selected amount of modified succinic anhydride (see table) was added dropwise to the reaction container and the pH of the system controlled by addition of 3% NaOH from a pH controller attached to a metering pump to maintain a pH of 8.0. The reaction was allowed to stir until the pH of the reaction did not change for 30 minutes without the addition of caustic. The starch was then filtered and treated as above. The results are shown in Table 1.

As shown in Table 1, using the method of this invention resulted in significantly higher amounts of bound anhydride reagent on the prepared starch derivatives and decreased reaction time when compared to the control samples prepared using the previously known procedure.

TABLE 1

| Starch Type | Reagent[1] | Treatment Level (%) | % Bound Reagent | Completion Time (hrs.) |
|---|---|---|---|---|
| Waxy (WF = 69) | DDSA | 10 | 5.14 | 12 |
| Waxy (WF = 56) | DDSA | 5 | 3.42 | 8 |
| Amioca | DDSA | 10 | 9.47 | 12 |
| Corn | DDSA | 10 | 6.07 | 12 |
| Hylon VII Fluidity | DDSA | 10 | 5.36 | 10 |
| Rice | DDSA | 10 | 7.94 | 12 |
| Hylon VII | DDSA | 15 | 11.52 | 12 |
| Amioca | DDSA | 20 | 15.41 | 12 |
| CONTROL (Amioca WF = 50) | DDSA | 10 | 0.08 | 18 |
| Amioca | OSA | 3 | 2.89 | 0.8 |
| Amioca | OSA | 10 | 8.63 | 1.5 |
| Amioca (WF = 50) | OSA | 25 | 23.3 | 4 |
| Amioca (WF = 50) | OSA | 50 | 19.79 | 3 |
| CONTROL Amioca | OSA | 3 | 2.45 | 6 |
| CONTROL Amioca | OSA | 10 | 3.7 | 8 |
| Amioca (WF = 46) | ASA | 5 | 2.27 | 24 |
| CONTROL (Amiom WF = 46) | ASA | 10 | 0.02 | 24 |

[1]DDSA is dodecenyl succinic anhydride
OSA is octenyl succinic anhydride
ASA is alkenyl succinic anhydride (mixture of $C_{16}$ and $C_{18}$).

What is claimed is:

1. A method of preparing a hydrophobic starch derivative comprising reacting starch with an organic acid anhydride in an aqueous system wherein:

a) starch is slurried in water at an acid pH of less than 7.0, b) an organic acid anhydride reagent having the following formula is added to the slurry,

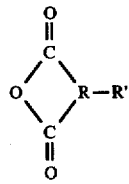

where R is a dimethylene or trimethylene group and R' is a hydrocarbon group having 2 to 20 carbon atoms, c) intimately contacting the starch and anhydride reagent by mixing to form a stable dispersion, and d) adding alkali material to the starch dispersion to adjust the pH to an alkaline pH of greater than 7.0 to initiate the reaction and adding further alkali material to maintain the pH at that level until the reaction is complete.

2. The method of claim 1 wherein R' is an alkyl, alkenyl, aralkyl or aralkenyl group.

3. The method of claim 1 wherein the acid pH in step a) is from about 1 to 6 and the alkaline pH of step d) is from about 7.1 to 11.

4. The method of claim 1 wherein the alkali material is an alkali metal hydroxide.

5. The method of claim 1 wherein R' has 5 to 18 carbon atoms.

6. The method of claim 5 wherein R' is an alkyl, alkenyl, aralkyl or aralkenyl group.

7. The method of claim 6 wherein the acid pH in step a) is from about 1 to 6 and the alkaline pH of step d) is from about 7.1 to 11.

8. The method of claim 7 wherein the alkali material is an alkali metal hydroxide.

9. The method of claim 8 wherein the acid pH in step a) is about 2 to 3 and the alkaline pH of step d) is about 8 to 9.

10. The method of claim 9 wherein the alkali material is sodium hydroxide.

11. The method of claim 10 wherein R is a dimethylene group.

12. The method of claim 11 wherein R' is an alkenyl group of 8 to 12 carbon atoms.

13. A hydrophobic starch derivative prepared by reacting starch with an organic acid anhydride in an aqueous system wherein:

a) starch is slurried in water at an acid pH of less than 7.0, b) an organic acid anhydride reagent having the following formula is added to the slurry,

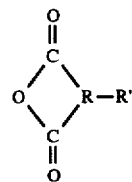

where R is a dimethylene or trimethylene group and $R^1$ is a hydrocarbon group having 2 to 20 carbon atoms, c) intimately contacting the starch and anhydride reagent by mixing to form a stable dispersion, and d) adding alkali material to the starch dispersion to adjust the pH to an alkaline pH of greater than 7.0 to initiate the reaction and adding further alkali material to maintain the pH at that level until the reaction is complete.

14. The hydrophobic starch derivative of claim 13 wherein $R^1$ is an alkyl, alkenyl, aralkyl or aralkenyl group having 5 to 18 carbon atoms, the acid pH in step a) is from about 1 to 6 and the alkaline pH of step d) is from about 7.1 to 11.

15. The hydrophobic starch derivative of claim 13 wherein R is a dimethylene group, $R^1$ is an alkenyl group of 8 to 12 carbon atoms, the alkali material is sodium hydroxide, the acid pH in step a) is about 2 to 3 and the alkaline pH of step d) is about 8 to 9.

* * * * *